United States Patent Office 2,914,441
Patented Nov. 24, 1959

2,914,441
METHOD AND COMPOSITION FOR PEST CONTROL

Murray Zakheim, Philadelphia, Pa., assignor to Pennsalt Chemicals Corporation, a corporation of Pennsylvania No Drawing. Application February 9, 1955
Serial No. 487,215

9 Claims. (Cl. 167—42)

The present invention relates to pest control and more particularly to the control of pests which either breed or live in bodies of water, such as mosquito larvae, mollusks, undesirable fish, etc.

It is frequently desirable to exterminate certain types of life forms occurring in ponds, lakes, etc., which are either harmful to man or are harmful to types of fish which it is desirable to raise in these bodies of water. For example, it is well known that mosquitos breed in bodies of still water, the mosquito larvae living within the water until finally maturing into the adult mosquito. Also, certain small snails occurring in the Nile River and some other areas act as carriers for schistosomiasis. The intermediate forms of the infecting organisms pass from the snail into the water and then through the skin of any humans that might enter the water, thus infecting the humans. Also, where fish are raised, the ponds at times become populated with scavenger fish which are ground feeders and continually stir up the eggs of the fish which are being bred, thus preventing proper hatching. They also eat the eggs and young fish. It is, therefore, frequently desirable to exterminate all of the fish in the pond and start afresh with the breeding of the desired fish species.

Due to the large space, even in small bodies of water, it is frequently difficult to exterminate the different types of life forms because of the difficulty of insuring contact of the biocidal agent with the life form which it is desired to exterminate.

It is one of the objects of the present invention to distribute a toxicant in or on the surface of a body of water so that it will effectively contact the pests it is desired to destroy without it being necessary to disperse the toxicant uniformly throughout the whole body of water.

Another object of the present invention is to destroy pests in water bodies by distributing uniformly over the surface of the body of water a material toxic to the life form which it is desired to destroy.

A further object of the present invention is to prepare insecticides in such a form that they are uniformly dispersed over the surface of a body of water so as to form a continuous toxic film which will kill any life form entering or leaving the water surface which is susceptible to the toxicant used.

A still further object is to prepare insecticide compositions which will be rapidly dispersed over the surface of any body of water to which they are added, but will adhere to any object which penetrates this surface, either going into the water or coming out of the same.

Another object of the invention is to form insecticide compositions which will first disperse themselves in a thin film over the surface of any body of water to which they are added, and then gradually settle through the body of water so as to uniformly treat the whole water space.

These and other objects are obtained by blending the insecticide with a finely-divided film forming material which has the characteristic of adhering to any object with which it come in contact after it has once been added to water, and with a dispersant. Film forming materials found satisfactory for this purpose are any of the class formed of fatty acid insoluble soaps, including those of vegetable and animal origin, insoluble salts of petroleum sulfonates and insoluble salts of alkyl aryl sulfonates.

As a film forming material, any material may be used which when finely-divided and placed on the surface of water will form a skin or film in which the particles appear to adhere to each other and adhere to objects penetrating such film.

It has been discovered that if these film forming materials are added in a solid finely-divided form to a pesticide together with a small amount of a surface active agent of the anionic type and the whole blended so as to give a finely-divided free flowing powder, a composition will result, which on addition to a body of water, will rapidly spread over the surface of the water forming a very thin continuous film which film has the property of adhering to anything that may pass through it. The film forms rapidly, and will even leave the surface of the water and creep up a short distance on the surface of objects extending down into the water, such as blades of grass, rocks, etc. To illustrate this, when a small amount of a composition of this type is added to a beaker of water the material rapidly disperses over the surface of the water and creeps up the side of the beaker as much as three centimeters.

Though a partial film will be formed on water surfaces, with compositions of the type described, without the inclusion of a surfactant, the addition of the surfactant is necessary in order to obtain a rapid dispersion of the composition in the form of a thin continuous film over the whole treated surface. Without the presence of the surfactant the composition tends to lie on the surface of the water in the form of small floating islands rather than as a continuous thin unbroken film. That the surfactant acts to disperse the film, rather than to cause wetting of the composition so as to cause it to settle in the water is somewhat surprising. Though all surfactants have some tendency to aid in the dispersion of film, many surfactants are unsuitable for the purpose of the present invention since their dispersing effect is not too pronounced while their wetting action causes the composition to settle in the water thus defeating the purpose of the composition; i.e., to first spread as a thin toxic film uniformly over the water surface. Thus, the cationic and non-ionic surfactants are generally less suitable than the anionics.

However, when small amounts of anionic surfactants are included in the composition, the composition spreads rapidly over the surface of the water in a substantially continuous, extremely thin toxic film which will adhere to anything passing through the surface.

In practicing the present invention, it is preferable to include a diluent which may be either of the wettable type, such as Attaclay (a commercial grade of attapulgite), bentonite or other hydrophilic diluents, or of a non-wettable type, such as Pyrax (a commercial grade of pyrophyllite) or Silvacon (ground bark) or other diluents which tend to remain on the surface of water. Where it is desired that the toxicant material remain on the water surface in the form of a film, the diluent added is of the non-wettable or floating type. The continuous film formed in such a case remains indefinitely on the water surface. However, if it is desired to form a film which, after being dispersed over the surface of the water, will then settle down through the water so as to also exterminate pests which do not necessarily break through the surface, a wettable clay, such as Attaclay is used. Moreover, certain combinations of two or more wettable and non-wettable diluents, in any proportion, are used to produce any desired degree of suspension of the toxicant on the water surface. The degree of suspension of the toxicant is also conveniently regulated by regulating the amount of wetting agent in the composition. Thus the composition can be adjusted so that the toxicant will settle through the water shortly after the film has been formed or remain on the water surface for days.

In practicing the invention the film forming material should be present in the final composition in an amount of at least 2%. Where it is desired that the toxic film remain on the surface of the water treated, there is no upper limit to the amount of film forming material used, recognizing the fact that the composition should also contain the insecticide and preferably a wetting agent. However, if the composition is to be used for forming a temporary film, with the toxicant then gradually settling through the body of the water treated, the film forming material should not be present in amounts much in excess of about 5%. Also, in formulations of this type, it is necessary to use substantial amounts of a wettable inert material as previously stated. The wettable inert material should be present in amounts of at least 25% and may be present in amounts up to about 95%. Where a wetting agent is used, the wetting agent is found to be effective in amounts of .5 to 10% though the preferred limits for the wetting agent are generally in the order of 1 to 4%. Care should be used in using the higher concentrations of wetting agent that the composition is not so susceptible to wetting that it will tend to settle into the body of the water treated before a surface film is formed.

With reference to the film forming material, though it is believed that any of the class of fatty acid insoluble soaps, insoluble salts of petroleum sulfonates and insoluble salts of alkyl aryl sulfonates may be used, the best results are obtained when using the fatty acid insoluble soaps of both vegetable and animal origin. These soaps include the oleates, stearates, palmitates, linoleates, naphthenates, resinates, and laurates of such metals as zinc, aluminum, calcium and magnesium. Of these, the stearates and resinates are preferred. The film forming material should preferably have a particle size of —325 mesh—the finer the particle size the better the results obtained.

The invention may be used for the dispersion of any liquid or solid toxicant material, the concentration of the toxicant material being determined by the toxicity of the material and the concentration in which it is needed in order to give the control desired.

The following examples of compositions will help better to illustrate the wide applicability of the present invention.

EXAMPLE 1

The following table gives examples of different compositions prepared and tested, using as a base a formulation consisting of 10% DB-50 (50% DDT in Attaclay), 1% Igepon AP (fatty alkyl ester of sodium isethionate), 86% bentonite and 3% Silvacon, and in which the film forming material is varied. Five parts by weight of the film forming material are blended with 95 parts of the base. The example illustrates the unsuitability of the soluble fatty acid soaps.

Table I

| Film Forming Material | Performance | | |
|---|---|---|---|
| | Film formation | Spreading | Wetting |
| zinc stearate | good | good | none. |
| magnesium stearate | do | do | Do. |
| aluminum stearate | do | | Do. |
| sodium stearate | poor | | extreme. |
| sodium resinate | do | | Do. |
| sodium oleate | do | | Do. |
| stearic acid | fair | poor | Do. |

EXAMPLE 2

The following table gives examples of different compositions prepared, using as a base a formulation consisting of 5% magnesium stearate, 10% DB-50 and 85% Pyrax, and in which the wetting agent is varied. Four parts by weight of the wetting agent are blended with 96 parts of the base.

Table II

| Wetting Agent | Type | Class | Spreading Activity |
|---|---|---|---|
| Igepon AP | ester of sod. isethionate | anionic | good. |
| Igepon T | sod. N-methyl N-oleoyl taurate. | do | Do. |
| Aerosol IB | diisobutyl sod. sulfosuccinate. | do | excellent. |
| Duponol WA | sod. sulfate of lauryl alcohol | do | fair. |
| Alkanol B | alkyl aryl sulfonate | do | good. |
| Areskap 100 | do | do | Do. |
| Aerosol OS | do | do | excellent. |
| Aldo 28 | glycerolmanostearate | non-ionic | poor. |
| Intracol O | fatty acid amide with multiple amino groups. | cationic | fair. |
| Arquad 2C | quaternary ammonium salt | do | poor. |

The alkyl aryl sulfonates are described in Zimmerman & Lavine, "Handbook of Material Trade Names" (Industrial Research Service, 1953).

EXAMPLE 3

The following table gives examples of different compositions prepared, using as a base a formulation consisting of 4% zinc stearate, 1% Igepon AP, 92% bentonite and 3% Silvacon, and in which the toxicant is varied. Effective dosages of the different toxicants, which vary on a weight basis, were used, the composition being made up to 100 parts by weight with the base.

Table III

| Toxicant | Weight Percent | Film Formation |
|---|---|---|
| DB-50 | 5 | good. |
| 2, 4-D | 5 | Do. |
| Rotenone | 10 | Do. |
| Calcium pentachlorophenate and tribasic copper sulfate. | 5 | Do. |

EXAMPLE 4

The film-forming, spreading and especially the wetting characteristics of the compositions can be varied by the type and amount of diluent or diluent mixture added, as follows:

(1) A composition containing 144 parts (by weight) of sodium pentachlorophenate, 62.5 parts $CuSO_4 \cdot 5H_2O$, 71.5 parts tribasic copper sulfate, 12 parts zinc stearate, 12 parts Kreelon 4G (an alkyl aryl sulfonate), 127 parts Attaclay and 127 parts Pyrax gave good film formation and spreading action, and wetted out slowly after the film had been formed.

(2) A composition containing 144 parts sodium pentachlorophenate, 62.5 parts $CuSO_4 \cdot 5H_2O$, 71.5 parts zinc stearate and 261 parts Silvacon formed a good film, which even after saturation of the Silvacon, continued to float.

(3) A composition containing 1% toxicant, 2% Kreelon 4G, 3% zinc stearate and 94% Pyrax gave fair spreading action, good film formation and remained on the water surface without wetting out.

(4) A composition similar to the preceding one, but containing Attaclay in place of Pyrax and having 2.5% Kreelon 4G, gave good film formation and spreading action, and subsequently wetted out.

In the above compositions and throughout the specification and claims parts or percent when given are by weight.

The above compositions were prepared by blending and grinding together the various components, for example by trituration or by hammer-milling or air milling. It was found that in general the wettability of the compositions was increased if the diluent was blended in after the other components had been ground, and conversely, if the diluent was blended with the other components before grinding, the wettability was decreased. If the compositions were not ground, but simply blended, wettability was more than in compositions that were ground.

In the specific examples only the stearates have been illustrated as the film forming agents thus giving a better basis for comparison of the various ingredients in the pesticide formulations. However, as previously indicated the insoluble metal resinates, for the purposes of the present invention are, substantial equivalents of the stearates, and essentially identical formulations, where the resinate is used in place of the stearate, may be employed.

In describing the invention, examples have been given in which some of the film forming materials mentioned have been used, and wherein a few of the many available liquid or solid toxicant materials have been employed. However, it should be apparent to one skilled in the art that many different formulations using different toxicant materials and different film forming materials together with various wetting agents and wettable or non-wettable diluents can be employed. The invention, of course, includes the use of any such materials in the manner described.

Also, though the present invention includes novel compositions which will form a toxic film when applied to the surface of water, the invention is not limited to such compositions but also includes the novel method of exterminating mollusks which periodically break the surface of the water when crawling up on grass, rush stems or other objects protruding through the surface. Some control of these and similar pests can also be obtained by forming a toxic surface film through dissolving a toxicant in an oily solvent, such as kerosene, or similar oil that will then float on the surface of the water. Examples of such toxic films would be those formed by adding to the water surface kerosene having dissolved therein toxicants, such as DDT and pentachlorophenol.

Though materials of this type are included in the process of the present invention they are not as effective as the solid powder formulations described since they do not form a continuous unbroken film but rather when added to the surface of the water form what might be considered as toxic islands.

Having thus described my invention I claim:

1. A toxicant powder for dusting over the surface of water for controlling pests therein, said powder forming a self-propagating continuous film on the water surface on contact therewith, and comprising an intimate mixture of a minor amount of a solid, finely divided toxicant, at least 2% by weight of a solid, finely divided film-forming material selected from the group consisting of insoluble fatty acid soaps, insoluble salts of petroleum sulfonates and insoluble salts of alkyl aryl sulfonates, from .5% to 10% of a solid, finely divided anionic surface active agent and a major amount of a solid, finely divided inert diluent.

2. A composition according to claim 1 in which said diluent is of the wettable type.

3. A composition according to claim 1 in which said diluent is of the non-wettable type.

4. A toxicant powder for dusting over the surface of water for controlling pests therein, said powder forming a self-propagating continuous film on the water surface on contact therewith, and comprising a minor amount of a solid, finely divided toxicant, at least 2% by weight of a finely divided insoluble fatty acid soap as a film-forming material, from 0.5% to 10% of a solid finely divided anionic surface active agent and from 25% to 95% of a finely divided inert diluent.

5. A composition in accordance with claim 4 in which said finely divided insoluble fatty acid soap is present in amounts of from 2% to 5%.

6. The composition of claim 4 wherein the anionic surface active agent is at least one of the group consisting of sodium alkyl aryl sulfonates, alkyl esters of sodium isethionate, sodium N-methyl N-oleoyl taurate, diisobutyl sodium sulfosuccinate and the sodium sulfate of lauryl alcohol.

7. The composition of claim 4 wherein the surface active agent is present in amounts of 1% to 4% by weight.

8. The composition of claim 4 wherein the fatty acid soap is a metal stearate of the group consisting of zinc, aluminum, calcium and magnesium.

9. The composition of claim 4 wherein the fatty acid soap is a metal resinate of the group consisting of zinc, aluminum, calcium and magnesium.

References Cited in the file of this patent

UNITED STATES PATENTS

| | | |
|---|---|---|
| 1,877,851 | Grant | Sept. 20, 1932 |
| 2,144,808 | Parker | Jan. 24, 1939 |
| 2,202,148 | Ginsburg | May 28, 1940 |
| 2,258,390 | Martin | Oct. 7, 1941 |

OTHER REFERENCES

West: DDT The Synthetic Insecticide (1946), pp. 121–135.

Brown: "Insect Control by Chem.," 1951, John Wiley and Sons, Inc., N.Y., pp. 48 and 49.

Frear: "Chem. of Insecticides, Fung. and Herb.," 2nd ed., 1948, D. Van Nostrand Co., Inc., N.Y., p. 199.